Figures 1, 2:
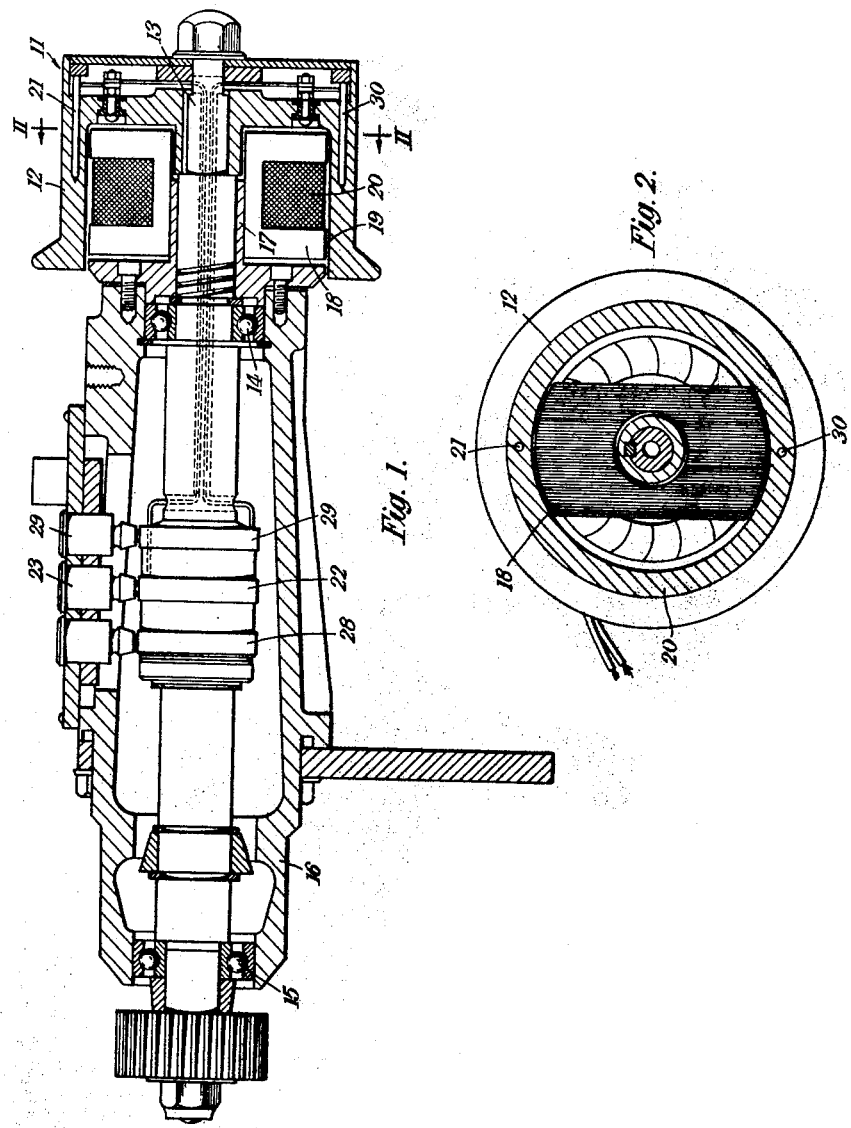

June 1, 1965

J. FRANCE 3,187,150

HEATING ARRANGEMENTS

Filed Sept. 25, 1962

2 Sheets-Sheet 1

INVENTOR
Joseph France
By Noete & Noete
attorneys

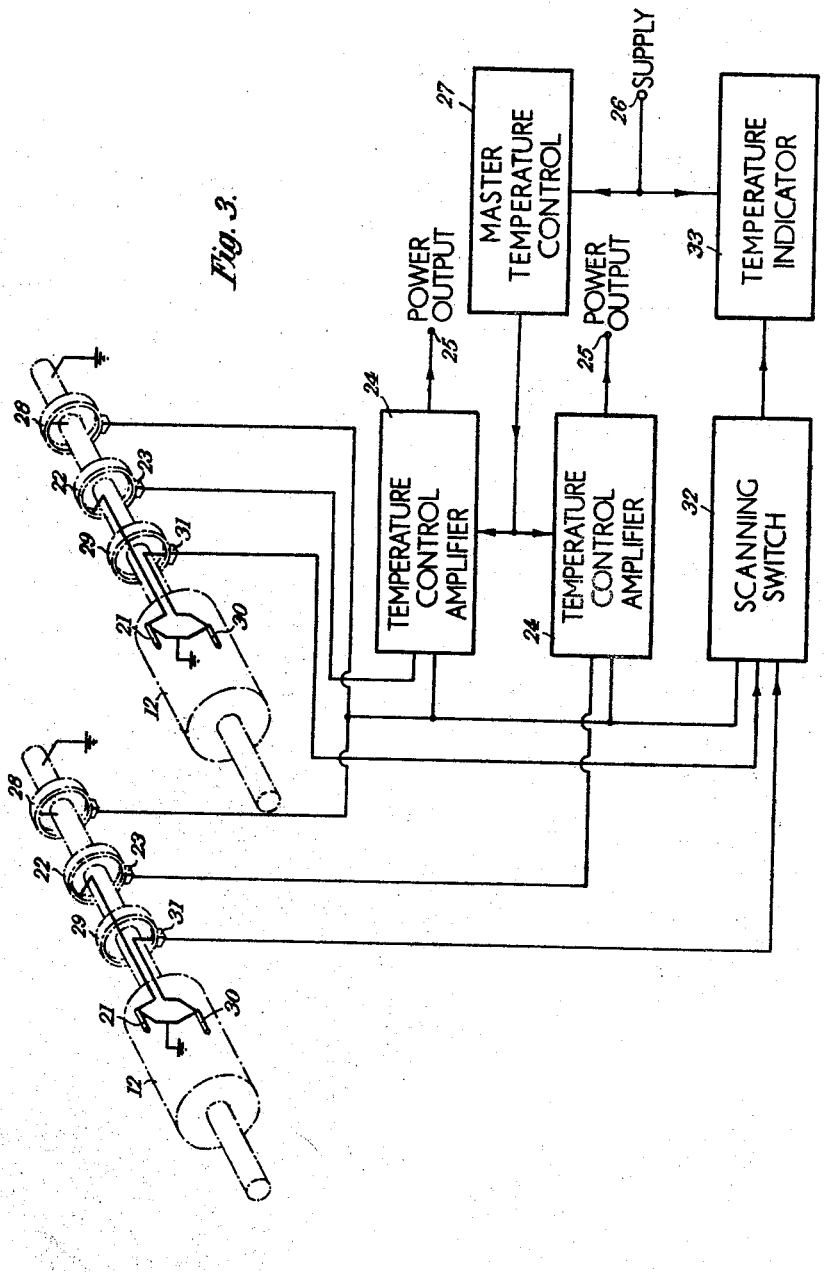

United States Patent Office 3,187,150
Patented June 1, 1965

3,187,150
HEATING ARRANGEMENTS
Joseph France, Bolton, England, assignor to T.M.M.
(Research) Limited, Oldham, England
Filed Sept. 25, 1962, Ser. No. 226,030
Claims priority, application Great Britain, Sept. 26, 1961,
34,478/61
5 Claims. (Cl. 219—10.49)

The present invention relates to heating arrangements, and is particularly, though not exclusively, concerned with a heating arrangement for the localised heating of a travelling yarn or thread in a continuous processing operation.

According to the present invention there is provided a heating arrangement comprising a rotatable member in the form of a solid of revolution and rotatable about the axis of revolution, and means for inducing eddy currents in said member to heat the latter by setting up an alternating flux in paths passing through said member in planes parallel to the axis of rotation of the member.

Preferably the means for generating the alternating flux comprises an iron core and an electric coil wound thereon, which is supplied with alternating current from a remote source, and in the preferred arrangement the rotatable member is a hollow cylindrical shell and the core and coil are stationarily arranged within the shell.

Furthermore, in the preferred arrangement the formation of the core is such that the portion of the hollow shell linked by the flux paths is at any instant magnetised substantially uniformly throughout its circumferential extent. It will be apparent that by arranging for the flux paths to extend in planes parallel to the axis of rotation the generation of eddy currents is unaffected by the rotation of the hollow member and an accurately controlled and constant temperature of the member can be maintained.

One embodiment of the invention will now be described by way of example with reference to the accompanying drawings in which, FIG. 1 is a cross-sectional side elevation of a heated roller for use in a textile processing machine, FIG. 2 is a cross-sectional end elevation of the arrangement shown in FIG. 1 taken on the line II—II in FIG. 1, and FIG. 3 is a block schematic diagram of circuits used with the arrangement shown in FIG. 1.

Referring first to FIGS. 1 and 2 there is provided at each position along a textile processing machine a heated-roller arrangement in which yarn fed through the machine is locally heated. The roller arrangement comprises a driven roller 11 which is in the form of a hollow cylindrical shell 12 closed at one end and fixedly and concentrically mounted on the end of a driving shaft 13 so that the skirt portion of the shell extends along the shaft. The driving shaft 13 is mounted in spaced bearings 14 and 15 carried by the machine frame 16, and in the region where it passes through the skirt portion is provided with a sleeve 17 fixed to the machine frame 16 and extending along the shaft 13 within the skirt portion of the shell 12. Upon the sleeve 17 there is stationarily arranged a laminated iron core 18 made up of a large plurality of laminations extending parallel to the axis of the shaft 13, the core being so shaped as to conform to the shape of the skirt portion and to provide a constant air gap 19 between the inner surface of the skirt portion and the core. The core 18 is cut away to house a circular coil 20 arranged concentrically with respect to the driving shaft 13, and the arrangement is such that the core 18, when energised, provides a substantially uniform magnetisation of the skirt portion of the shell 12 throughout its circumferential extent, the flux paths set up in the skirt portion extending in planes parallel to the rotary axis. The energising coil 20 is connected to a remote alternating current supply, so that in operation an alternating flux is generated in the skirt portion of the shell 12 giving rise to eddy currents and the generation of heat within the shell.

In the preferred embodiment, the alternating current for each coil 20 is obtained from a remote amplifier the power output of which is automatically adjusted to maintain the roller 11 at a constant temperature. For this purpose a thermistor 21 is embedded in the skirt portion of the shell 12 and connected via a slip ring 22 on the driving shaft 13 to a control input of the amplifier so that a fall in temperature results in an increased power output from the amplifier and an increased heating effect, and vice versa.

Referring now to FIG. 3, this shows the control circuits for two roller positions along the length of the processing machine. The thermistor 21 at each position is connected via a slip ring 22 and a contact brush 23 to an input terminal of a temperature control amplifier 24 which is arranged to produce at an output terminal 25 a variable power output controlled by the thermistor 21. The amplifiers 24 are fed from a common alternating current supply applied to terminal 26 and a master temperature control potentiometer 27 is included in the supply circuit to provide for overall adjustment of the power outputs from the amplifiers. A further slip ring 28 which is connected to the shaft 13 provides a common earth reference potential for the amplifiers 24.

The power output from each control amplifier 24 is fed by means not shown to the energising coil 20 of the associated heated roller, and the arrangement is such that a fall in the temperature of the shell 12 of the roller results in increased power output from the amplifier 24 and an increased heating effect, and vice versa.

A third slip ring 29 is mounted on the shaft 13 and is connected to a second thermistor 30 also embedded in the shell 12. The slip rings 29 are connected by contact brushes 31 to separate input terminals of a scanning switch 32 which is arranged in operation to connect a temperature indicator 33 in turn and cyclically to successive input terminals of the scanning switch so that the temperature indicator 33 rapidly and successively indicates the temperatures of the rollers along the machine.

In the embodiment hereinbefore described the core 18 is made up of a large plurality of laminations extending parallel to the axis of the shaft 13. If preferred, however, the core may be formed from a solid block of magnetisable material cylindrical in shape and having in its periphery a groove containing a circular energising coil. In section the core and coil would appear as in FIG. 1, but viewed in end elevation the core would be seen to be circular, and the air gap between the core and the inner surface of the skirt portion would be of constant width.

What I claim as my invention and desire to secure by Letters Patent is:

1. A heating arrangement comprising a hollow cylindrical shell having a closed end, an elongated drive shaft extending coaxially into said shell and connected thereto for rotating the latter about its axis, said sell having a skirt portion surrounding said shaft, a stationary sleeve surrounding said shaft within said skirt portion of said shell, a laminated iron core mounted on said sleeve and including a plurality of laminations which extend parallel to the axis of said shaft, said core having outer surface portions conforming to the configuration of the inner surface of said skirt portion and defining therewith a constant air gap, a circular coil wound on said core and arranged concentrically between said shaft and shell so that upon energizing of said core a substantially uniform magnetization of the skirt portion of the shell will be provided, the flux set up in the skirt portion extending in paths which lie in planes parallel to the axis of said shell.

2. A heating arrangement comprising a hollow cylindrical shell, a magnetizable core arranged within said shell, support means maintaining said core stationary and supporting said shell for rotation about its axis, an electrical coil wound on said core and arranged concentrically within said shell for producing within the core an alternating magnetic flux which extends through the shell and in paths lying in planes parallel to the axis thereof, a thermistor mounted in a wall portion of said shell for rotation therewith, an amplifier operatively connected to said coil for supplying energizing current thereto, and slip-ring means connecting said thermistor to said amplifier for controlling the supply of current to said coil so as to maintain the temperature of said shell substantially constant.

3. A heating arrangement according to claim 2, wherein a further temperature responsive element is mounted in another wall portion of said shell for rotation therewith, and temperature-indicating means operatively connected to said further temperature responsive element.

4. A textile processing machine comprising a plurality of heating zones in which yarn fed through the machine is to be locally heated, each heating zone including a hollow roller over which the yarn is adapted to pass, a stationary magnetizable core arranged within said roller, and an electric coil wound on said core concentrically with respect to said roller within the latter for producing within said core an alternating magnetic flux which extends through said roller in paths lying in planes parallel to the axis of rotation of the roller.

5. A heating arrangement comprising a cylindrical heating roller having a hollow interior, support means supporting said roller for rotation about its axis, a laminated core located within said roller and maintained stationary by said support means, said laminated core being formed with a cutout extending around said core along a circle whose center is in the axis of said roller, and an electric coil located in said cutout so that upon energizing of said coil from an alternating source, a flux set up in said core will pass through said roller along paths lying in planes parallel to the axis of said roller.

References Cited by the Examiner

UNITED STATES PATENTS

| 2,541,416 | 2/51 | Harrison | 219—10.49 |
| 2,588,466 | 3/52 | Barnes | 310—178 |
| 2,968,711 | 1/61 | Zuppirdi | 219—10.61 |
| 3,014,116 | 12/61 | MacArthur | 219—10.49 |
| 3,042,782 | 7/62 | Bray | 219—499 |
| 3,103,571 | 9/63 | Axelsson et al. | 219—10.61 |

RICHARD M. WOOD, *Primary Examiner.*